United States Patent
Lumpkin et al.

[15] 3,657,554
[45] Apr. 18, 1972

[54] SUPER-RADIANT SHORT PULSE LASER

[72] Inventors: Oscar J. Lumpkin, New York; Norman S. Shiren, Mount Kisco, both of N.Y.

[73] Assignee: International Business Machines Corporation, Armonk, N.Y.

[22] Filed: June 30, 1969

[21] Appl. No.: 837,599

[52] U.S. Cl..............................................307/88.3, 331/94.5
[51] Int. Cl..............................................H03f 7/00
[58] Field of Search.................................307/88.3; 331/94.5

[56] References Cited

OTHER PUBLICATIONS

Treacy et al., " Physics Letters," June 16, 1969, pp. 369–370.

*Primary Examiner*—Roy Lake
*Assistant Examiner*—Darwin R. Hostetter
*Attorney*—Hanifin and Jancin and Joe L. Koerber

[57] ABSTRACT

Short intense lasing pulses of resonant radiation, of the order of $10^{-13}$ sec., are produced by employing adiabatic rapid passage of an optical transition of an optically resonant medium, such as K-vapor. The adiabatic rapid passage is achieved in the K-vapor by frequency modulating each pulse of a ruby laser giant pulse source. The modulated pulses are then passed through a fluoro-nitrobenzene Raman cell to provide an output pulse which has the required power and whose instantaneous carrier frequency sweeps through a resonance having a pair of levels connected by electric dipole transitions in the K-vapor system.

6 Claims, 3 Drawing Figures

PATENTED APR 18 1972　　　　　　　　　　　　　　　3,657,554
FIG. 1
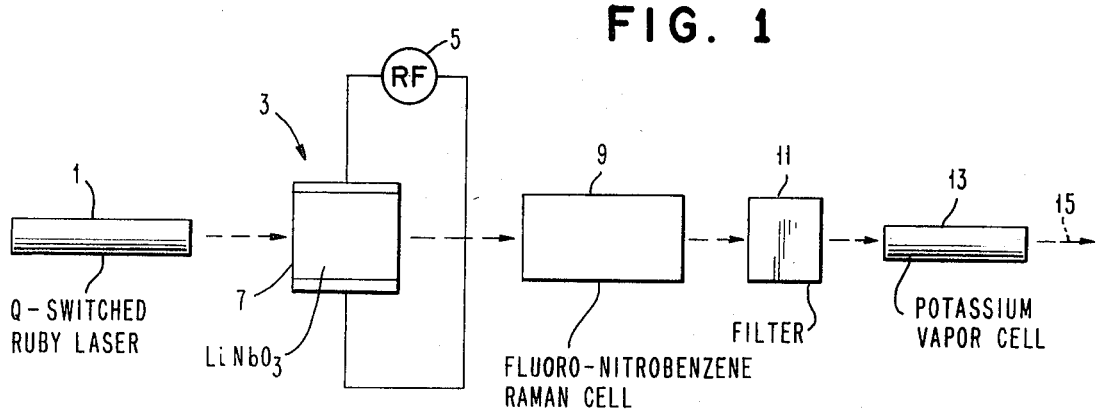
FIG. 2
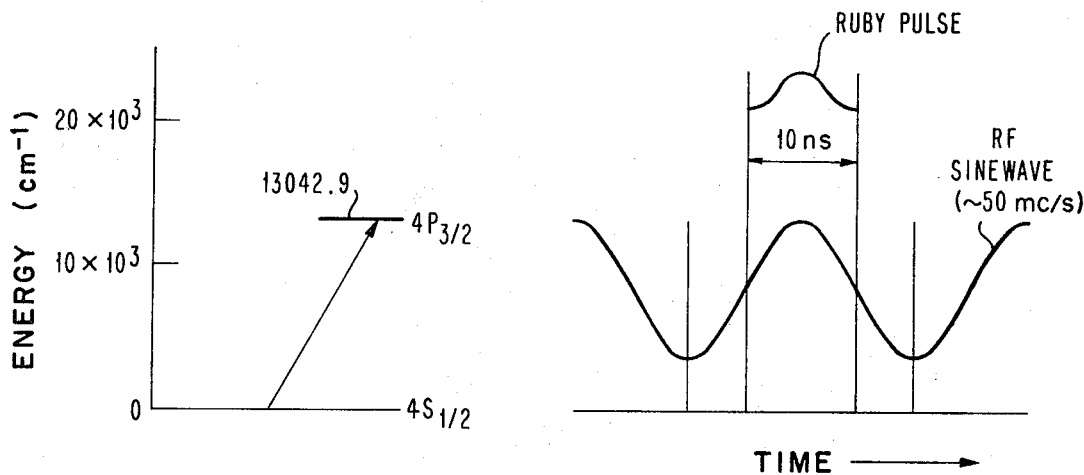
FIG. 3
INVENTORS
OSCAR J. LUMPKIN
NORMAN S. SHIREN
BY *Joe L. Koerber*
ATTORNEY

SUPER-RADIANT SHORT PULSE LASER

BACKGROUND OF THE INVENTION

The present invention relates to a super-radiant short pulse laser and more particularly to a super-radiant short pulse laser initially pumped by adiabatic rapid passage. In accordance with the teachings of the present invention an arrangement is provided for producing pulses which are both short in duration, in the order of subpicosecond, and high in intensity.

The super-radiant state of a coherence brightened laser has been described in the literature, as seen by reference to an article entitled "The Coherence Brightened Laser" by R. H. Dicke in the *Proceedings of the 1963 Conference on Quantum Electronics*, Vol. 1, page 35, Columbia Univ. Press, New York, 1964.

It is known in the prior art that conventional lasers employ mirrors in order to produce feedback amplification and provide the condition necessary to effect coherent radiation. On the other hand, it is known that mirrors need not be used in a system employing a radiator which is initially in a super-radiant state (as described by Dicke). In such an arrangement the directivity of the super-radiant transitions results from the pencil-like shape of the radiator wherein the radiator operates in what is described as the "end fire mode." The advantages of the latter laser system reside in its simplicity, efficiency and ability to produce pulses of high intensity and short duration.

In a coherence brightened laser the radiation process can be described in terms of a short and intense optical shock wave propagating along an elongated array of atoms. With all of the atoms in their excited states a sufficiently intense pulse would dump the energy in each atom into the wavefront. Under such conditions the pulse would shorten because of the non-linearity of the polarization response to a short transient exciting pulse. In such an arrangement, for the laser to be sufficiently brightened to provide super-radiant emission virtually complete population inversion must be achieved wherein the condition to be satisfied is that $$n \gg \frac{cw^2 \Delta \nu}{\lambda^2 L (\Delta \nu_{rad})^2} \sim \frac{c \Delta \nu}{\lambda (\Delta \nu_{rad})^2}$$

where $n$ is the number of atoms, all initially excited; $c$ is the speed of light; $w$ and $L$ are the width and length of the potassium vapor cell, respectively; $\lambda$ is the wavelength of the laser; $\Delta \nu$ is the incoherent line breadth including inhomogeneous broadening, doppler broadening and relaxation broadening in addition to radiation broadening. $\Delta \nu_{rad}$ is the radiation line breadth.

SUMMARY OF THE INVENTION

In accordance with the teachings of the present invention complete population inversion according to the above stated condition is achieved by employing adiabatic rapid passage of an optical transition. For a general description of the basic principles of adiabatic rapid passage reference is made to the text entitled "The Principles of Nuclear Magnetism" by A. Abragam, pg. 34 et seq., 1961, Oxford Press, England. Adiabatic rapid passage, as will be described in accordance with the principles of the preferred embodiment hereinafter shown, acts to provide the required means for effecting a rapid inversion transition from the ground state to an excited state, for each of the atoms in a two level electric dipole connected system, such that the total time for virtually complete population inversion is relatively small. The necessity of a small inversion time will become clear when it is recognized that to attain the super-radiant inversion condition stated above, in addition to the requirement that the exciting pulse be of high intensity, it is also required that the exciting and emitted pulses traverse the medium in times short compared to the dominant relaxation time for the system.

Alternatively, it may be said that super-radiance requires the exciting pulse to the system be of sufficient intensity to provide the required population inversion and be of sufficiently short length such that the duration of the pulse is short as compared to the spontaneous relaxation time whereby inversion is obtained in a time short compared to the spontaneous emission time.

Accordingly, it is an object of this invention to provide an improved coherent light pulse source.

It is a further object of this invention to provide a super-radiant short pulse laser.

It is yet another object of his invention to provide an arrangement for producing lasing pulses of extremely short duration.

It is still another object of this invention to provide a laser device which is simple and efficient and which produces pulses of high intensity and short duration.

It is yet a further object of this invention to provide a coherenced brightened laser for effecting super-radiant emission by adiabatic rapid passage of an optical transition.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 1 shows a preferred embodiment of the novel concepts in accordance with the principles of the present invention.

FIG. 2 shows the energy levels in potassium vapor through which optical transition is obtained by adiabatic rapid passage in accordance with the preferred embodiment.

FIG. 3 shows the time relationship of the ruby laser pumping pulse to the RF signal modulating the pulse carrier frequency of the laser signal.

DESCRIPTION OF THE PREFERRED EMBODIMENT

In FIG. 1 there is shown a preferred arrangement for producing super-radiant laser pulses by adiabatic rapid passage of an optical transition in a two-level potassium vapor system. However, it is clear that within the teachings of the present invention adiabatic rapid passage to effect super-radiant laser pulses may be achieved in a medium other than potassium vapor. Likewise, it is clear that although a two-level system within potassium vapor is described, other than two-level systems may be employed in accordance with the teachings of the present invention.

To achieve adiabatic rapid passage of an optical transition to effect a population inversion for coherence brightening in a medium, it is first required that the medium be subjected to a strong light pulse the carrier frequency of which is swept, from either above or below, through the resonant frequencies of a transition resonance of the medium. It is also required that the rate at which the carrier frequency is swept be small compared to the intensity of the pumping light pulse such that $$\frac{\partial \omega_L}{\partial t} \ll \frac{p \epsilon}{\hbar}^2$$

where $\omega_L$ represents the carrier frequency of the light pulse, $p$ represents the transition dipole moment, $\epsilon$ represents the electric field and $\hbar$ represents Planck's constant.

Not only must the rate at which the carrier frequency of the pumping pulse is being swept through the resonant frequencies of a transition resonance be small compared to its intensity, but also the sweep through the transition resonance line must be effected in a time small compared to the time $T_1$, such that $$\frac{\partial \omega_L}{\partial t} \cdot \frac{1}{\Delta \omega} \gg T_1^{-1}$$

where $\Delta \omega$ is the width of the resonance line and $T_1$ is the relaxation time from the excited state to the ground state.

In the preferred embodiment of FIG. 1 there is shown an arrangement for producing adiabatic rapid inversion for the $4^2S_{1/2} \rightarrow 4^2P_{3/2}$ transition in potassium vapor. A high intensity light pulse source 1 is shown, which light pulse source is, in the preferred embodiment, a Q-switched ruby laser of conventional design. The output pulses of the Q-switched ruby laser are polarized parallel to the "C" axis of LiNbO₃ electro-optical doppler shifter 3. The output of RF signal source 5 is applied to the LiNbO₃ body 7 to modulate the carrier frequency of the ruby pulses received from Q-switched ruby laser 1. For a more complete discussion of frequency modulation of laser pulses as hereinabove described reference is made to an article entitled "Compression of Optical Pulses" by Giordmaine et al. in the *IEEE Journal of Quantum Electronics*, Vol. QE—4, No. 5, May 1968.

The frequency modulated output of LiNbO₃ electro-optical doppler shifter 3 is applied to excite fluoro-nitrobenzene Raman cell 9, which cell is known to those skilled in the art. The output pulse from fluoro-nitrobenzene Raman cell 9 is then passed through optical filter 11, to remove incident ruby light, and thereafter applied to excite pencil-like potassium vapor cell 13, to effect adiabatic rapid passage of the $4^2S_{1/2} \rightarrow 4^2P_{3/2}$ transition therein. Super-radiant pulses are emitted at 15.

It should be noted that although a pencil-shape vapor cell has been described and shown in the preferred embodiment, other shapes may also be employed. Although super-radiant emission is not generally critically dependent upon the shape of the vapor cell employed, the emitted radiation pulse width and frequency spread does depend upon shape, as well as the density of the vapor atoms. Thus, cell shapes and atom density may be selected in accordance with desired duration of the emitted super-radiant output pulse.

It is also significant to note that the Stokes output of a fluoro-nitrobenzene Raman cell, excited by a ruby laser giant pulse, is resonant with the potassium vapor $4^2S_{1/2} \rightarrow 4^2P_{3/2}$ transition and is of sufficient power, i.e., 300 KW (peak power) at about 13,044 cm⁻¹, to effect the transition. Such has been described by O. J. Lumpkin, Jr. in an article entitled "Four-Wave Parametric Interaction in Potassium Vapor" in the *IEEE Journal of Quantum Electronics*, April 1968, Vol. QE—4, No. 4.

Thus, the fluoro-nitrobenzene Raman cell acts to bring the ruby laser giant pulse frequency into the $4^2S_{1/2} \rightarrow 4^2P_{3/2}$ transition frequency range wherein the RF source 5 of frequency modulator 3 may sweep the ruby laser giant pulse from above the said transition frequency range through resonance. FIG. 2 shows the $4S_{1/2}$ and $4P_{3/2}$ potassium vapor energy levels wherein pumping action about the 4P level effects an energy level transition from the 4S level as indicated by the arrow.

In accordance with the conditions above stated, the pumping pulse source 1 and RF source 5, in FIG. 1, are chosen so as to effect a frequency sweep of the ruby laser giant pulse carrier frequency at a rate which is small compared to the fluoro-nitrobenzene Raman cell intensity but which fully sweeps a giant pulse of sufficiently short duration so as to effect a sweep through the potassium transition resonance line in a time small compared to the latter's relaxation time. In this respect a ruby laser giant pulse of approximately 10 ns modulated by a sine wave of around 50 mc/s has been found adequate and is given by way of exemplary values. FIG. 3 shows the optimum timing relationship of the ruby pulse to RF modulating electric field to effect adiabatic rapid passage modulation for the coherence brightening and super-radiant emission in potassium vapor in accordance with the principles of the present invention.

What is claimed is:

1. A coherence brightened short pulse laser wherein the necessary state for coherence brightened emission is obtained by adiabatic rapid passage of an optical transition in the lasing medium, comprising:
   a laser cell means containing vapor as the lasing medium;
   a pulsed pumping source means for producing a coherent light pulse of high intensity for excitation of said vapor in accordance with the relationship $$\frac{\partial \omega_L}{\partial t} \ll \left(\frac{p\epsilon}{\hbar}\right)^2$$

and
   means for sweeping the instantaneous frequency of said light pulse through the resonant frequency of an optically resonant transition of said vapor at a rate sufficiently rapid in accordance with the relationship $$\frac{\partial \omega_L}{\partial t} \cdot \frac{1}{\Delta\omega} \gg T_1^{-1}$$

for producing adiabatic population inversion and coherenced brightening thereby effecting super-radiant emission by satisfying the relationship $$n \gg \frac{cw^2\Delta\nu}{\lambda^2 L(\Delta\nu_{rad})^2} \sim \frac{c\Delta\nu}{\lambda(\Delta\nu_{rad})^2}$$

2. The laser as set forth in claim 1 wherein said inversion is between a pair of levels connected by an electric dipole transition.

3. The system as set forth in claim 2 wherein said vapor is potassium vapor.

4. The system as set forth in claim 3 wherein the said means for sweeping further comprises:
   RF modulation means for frequency modulating said coherent light pulse;
   a fluoro-nitrobenzene Raman cell for bringing the frequency range of the frequency modulated coherent light pulse into the $4^2S_{1/2} \rightarrow 4^2P_{3/2}$ transition frequency range.

5. The system as set forth in claim 4 wherein said pulsed pumping source means includes a Q-switched ruby laser.

6. The apparatus as set forth in claim 5 wherein said RF modulating means includes a LiNbO₃ medium for receiving said light pulses to be modulated therein by an RF electric field created by an RF modulating signal means.

* * * * *